United States Patent
Kathmann et al.

(10) Patent No.: US 10,409,573 B1
(45) Date of Patent: Sep. 10, 2019

(54) BATCH SCRIPT DECOMPOSER

(71) Applicant: International Business Machines Corporation, Armonk, NY (US)

(72) Inventors: Kevin J. Kathmann, Rochester, MN (US); Gary S. Puchkoff, Rochester, MN (US); Alexei L. Pytel, Rochester, MN (US); Steven J. Simonson, Rochester, MN (US); Thomas J. Wasik, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/898,771

(22) Filed: Feb. 19, 2018

(51) Int. Cl.
| | |
|---|---|
| *G06F 9/45* | (2006.01) |
| *G06F 9/445* | (2018.01) |
| *G06F 8/41* | (2018.01) |
| *G06F 17/27* | (2006.01) |
| *G06F 17/24* | (2006.01) |
| *G06F 8/30* | (2018.01) |

(52) U.S. Cl.
CPC .............. *G06F 8/456* (2013.01); *G06F 9/445* (2013.01); *G06F 17/241* (2013.01); *G06F 17/27* (2013.01); *G06F 8/30* (2013.01)

(58) Field of Classification Search
CPC ........ G06F 8/456; G06F 17/241; G06F 17/27; G06F 8/30; G06F 9/445
See application file for complete search history.

(56) References Cited

U.S. PATENT DOCUMENTS

| | | | |
|---|---|---|---|
| 6,064,819 A | 5/2000 | Franssen et al. | |
| 6,904,424 B1 | 6/2005 | Gusler et al. | |
| 7,047,232 B1 | 5/2006 | Serrano | |
| 9,430,200 B1 * | 8/2016 | Trofin | G06F 8/443 |
| 9,436,449 B1 * | 9/2016 | Chandnani | G06F 16/9574 |
| 9,557,879 B1 * | 1/2017 | Wang | G06F 3/0481 |
| 2012/0110433 A1 * | 5/2012 | Pan | G06F 17/211 |
| | | | 715/234 |

(Continued)

OTHER PUBLICATIONS

Yunquan Zhang, Parallel Processing Systems for Big Data: A Survey, 2015, pp. 2114-2133. https://ieeexplore.ieee.org/stamp/stamp.jsp?tp=&arnumber=7547948 (Year: 2015).*

(Continued)

*Primary Examiner* — Mongbao Nguyen
(74) *Attorney, Agent, or Firm* — Edward Li

(57) ABSTRACT

A method, a computer program product, and a computer system for generating a set of scripts that perform processing equivalent to an original script and achieve maximum parallel executions. A computer receives an original script including annotations defined by a user, builds a graph comprising nodes and representing execution steps in the original script, associates one or more attributes to the nodes, and determines dependencies between the nodes, based on accessing data sets or files by the execution steps. The computer modifies the dependencies between the nodes, using instructions contained in the annotations. The computer generates a set of scripts that perform processing equivalent to the original script and achieve maximum parallel executions, based on the nodes of the graph and the dependencies. The computer generates a script that defines dependencies between the scripts.

14 Claims, 3 Drawing Sheets

(56) References Cited

U.S. PATENT DOCUMENTS

| | | | | |
|---|---|---|---|---|
| 2012/0151198 | A1* | 6/2012 | Gupta | G06F 9/45558 713/2 |
| 2012/0290924 | A1* | 11/2012 | Vick | G06F 17/272 715/237 |
| 2013/0080993 | A1* | 3/2013 | Stravers | G06F 8/433 717/104 |
| 2014/0053059 | A1* | 2/2014 | Weber | G06F 9/45529 715/234 |
| 2014/0282433 | A1* | 9/2014 | Eilam | G06F 11/3688 717/131 |
| 2015/0088968 | A1* | 3/2015 | Wei | H04L 67/10 709/203 |
| 2015/0268992 | A1* | 9/2015 | Fan | G06F 9/4881 718/106 |
| 2016/0117189 | A1* | 4/2016 | Osborne | G06F 16/9024 718/102 |
| 2017/0161051 | A1* | 6/2017 | Nikam | G06F 8/65 |
| 2018/0196644 | A1* | 7/2018 | Bhakar | G06F 8/31 |
| 2018/0307465 | A1* | 10/2018 | He | H04L 29/08 |
| 2019/0108048 | A1* | 4/2019 | Chen | G06F 9/45537 |

OTHER PUBLICATIONS

Shannon Xu, Transforming Embedded Java Code into Custom Tags, 2005, pp. 1-10. http://post.queensu.ca/~trd/research/papers/xudeanEmbedded.pdf (Year: 2005).*

Jose Losada, Optimization Techniques to Speed Up the Page Loading in Custom Web Browsers, 2015, pp. 7-14. https://ieeexplore.ieee.org/stamp/stamp.jsp?arnumber=7349938 (Year: 2015).*

Kyungho Jeon, PigOut: Making Multiple Hadoop Clusters Work Together, 2014, pp. 100-109. https://ieeexplore.ieee.org/stamp/stamp.jsp?tp=&arnumber=7004218 (Year: 2014).*

Zhao Zhang, Parallelizing the Execution of Sequential Scripts, 2013, pp. 1-12. https://ieeexplore.ieee.org/stamp/stamp.jsp?tp=&arnumber=6877464 (Year: 2013).*

Taewook Oh, A Generalized Framework for Automatic Scripting Language Parallelization, 2017, pp. 356-367. https://ieeexplore.ieee.org/stamp/stamp.jsp?tp=&arnumber=8091257 (Year: 2017).*

Timothy G. Armstrong, Compiler Optimization for Extreme-Scale Scripting, 2014, pp. 571-574. https://ieeexplore.ieee.org/stamp/stamp.jsp?tp=&arnumber=6846503 (Year: 2014).*

Bellec et al. "The pipeline system for Octave and Matlab (PSOM): a lightweight scripting framework and execution engine for scientific workflows". Frontiers in Neuroinformatics. Original Research Article published: Apr. 3, 2012.

Cirou et al. "Triplet : a Clustering Scheduling Algorithm for Heterogeneous Systems." International Conference onParallel Processing Workshops, 2001. Sep. 3-7, 2001.

Wilde et al. "Swift: A language for distributed parallel scripting." Parallel Computing 37 (2011) 633-652. 2011 Elsevier B.V. All rights reserved.

Zhao et al. "Swift: Fast, Reliable, Loosely Coupled Parallel Computation." To appear: 2007 IEEE International Workshop on Scientific Workflows, Salt Lake City, Utah, U.S.A.

* cited by examiner

BATCH SCRIPT DECOMPOSER

BACKGROUND

The present invention relates generally to a batch script decomposer, and more particularly to a batch script decomposer generating a set of scripts that perform processing equivalent to an original script and achieve maximum parallel executions.

Many applications have regular maintenance performed by batch processes. "End of day" processing in a banking system is an example of batch process. Such batch process is frequently implemented as a large script that sequentially invokes a series of processing programs. Some of the processing programs depend on the results of a prior step and must be executed in the correct sequence. However, not all of these processing programs are dependent on each other. Some, perhaps many of the processing programs can be performed in parallel. The parallel execution may significantly reduce the total duration of execution of the entire script (batch window).

Currently existing tools can describe the dependencies between the execution steps in the script and invoke processing steps in the correct order, allowing, at the same time, to execute independent steps in parallel. However, the cost of manual conversion of the batch script using such tools can be prohibitive.

SUMMARY

In one aspect, a method for generating a set of scripts that perform processing equivalent to an original script and achieve maximum parallel executions is provided. The method comprises receiving, by a computer, an original script, wherein the original script includes annotations defined by a user. The method further comprises building, by the computer, a graph comprising nodes, wherein the graph represents execution steps in the original script. The method further comprises associating, by the computer, one or more attributes to the nodes in the graph, wherein the one or more attributes are specifications of data sets or files accessed by the execution steps. The method further comprises determining, by the computer, by analyzing the graph, dependencies between the nodes, based on accessing the data sets or the files by the execution steps. The method further comprises modifying, by the computer, the dependencies between the nodes in the graph, using instructions contained in the annotations. The method further comprises generating, by the computer, a set of scripts that perform processing equivalent to the original script and achieve maximum parallel executions, based on the nodes of the graph and the dependencies. The method further comprises generating, by the computer, a script that defines dependencies between the scripts.

In another aspect, a computer program product for generating a set of scripts that perform processing equivalent to an original script and achieve maximum parallel executions is provided. The computer program product comprising one or more computer-readable tangible storage devices and program instructions stored on at least one of the one or more computer-readable tangible storage devices. The program instructions executable to: receive, by a computer, an original script, wherein the original script includes annotations defined by a user, build, by the computer, a graph comprising nodes, wherein the graph represents execution steps in the original script; associate, by the computer, one or more attributes to the nodes in the graph, wherein the one or more attributes are specifications of data sets or files accessed by the execution steps; determine, by the computer, by analyzing the graph, dependencies between the nodes, based on accessing the data sets or the files by the execution steps; modify, by the computer, the dependencies between the nodes in the graph using instructions contained in the annotations; generate, by the computer, a set of scripts that perform processing equivalent to the original script and achieve maximum parallel executions, based on the nodes of the graph and the dependencies; and generate, by the computer, an additional script that defines dependencies between the scripts.

A computer system for generating a set of scripts that perform processing equivalent to an original script and achieve maximum parallel executions is provided. The computer system comprises one or more processors, one or more computer readable tangible storage devices, and program instructions stored on at least one of the one or more computer readable tangible storage devices for execution by at least one of the one or more processors. The program instructions are executable to receive, by a computer, an original script, wherein the original script includes annotations defined by a user. The program instructions are further executable to build, by the computer, a graph comprising nodes, wherein the graph represents execution steps in the original script. The program instructions are further executable to associate, by the computer, one or more attributes to the nodes in the graph, wherein the one or more attributes are specifications of data sets or the files accessed by the execution steps. The program instructions are further executable to determine, by the computer, by analyzing the graph, dependencies between the nodes, based on accessing the data sets or the files by execution steps. The program instructions are further executable to modify, by the computer, the dependencies between the nodes in the graph using instructions contained in the annotations. The program instructions are further executable to generate, by the computer, a set of scripts that perform processing equivalent to the original script and achieve maximum parallel executions, based on the nodes of the graph and the dependencies. The program instructions are further executable to generate, by the computer, a script that defines dependencies between the scripts.

DETAILED DESCRIPTION

Embodiments of the present invention provide a method for transformation of a batch execution script. The method disclosed in the present invention analyzes an original script and generates a new script or a set of scripts that is functionally equivalent to the original script. The new script or the set of scripts has an important difference—steps in the original script are executed in sequence one by one; however, in the new script or the set of scripts, some steps are executed in parallel. The method disclosed in the present invention detects dependencies between steps and preserves the order only for those steps where it is functionally necessary.

Embodiments of the present invention disclose a method for generating definition of a set of dependencies between the steps allowing execution of dependent processing steps in a correct order. Embodiments of the present invention disclose a method for generating a set of scripts, each of which represents a step extracted from the original script. When the scripts in the set are executed under control of the definition mentioned above, dependent scripts are executed in the correct order and independent scripts are executed in arbitrary order. When the independent scripts are executed in parallel potentially on different systems in a cluster of systems, time savings are realized.

Figure 1:
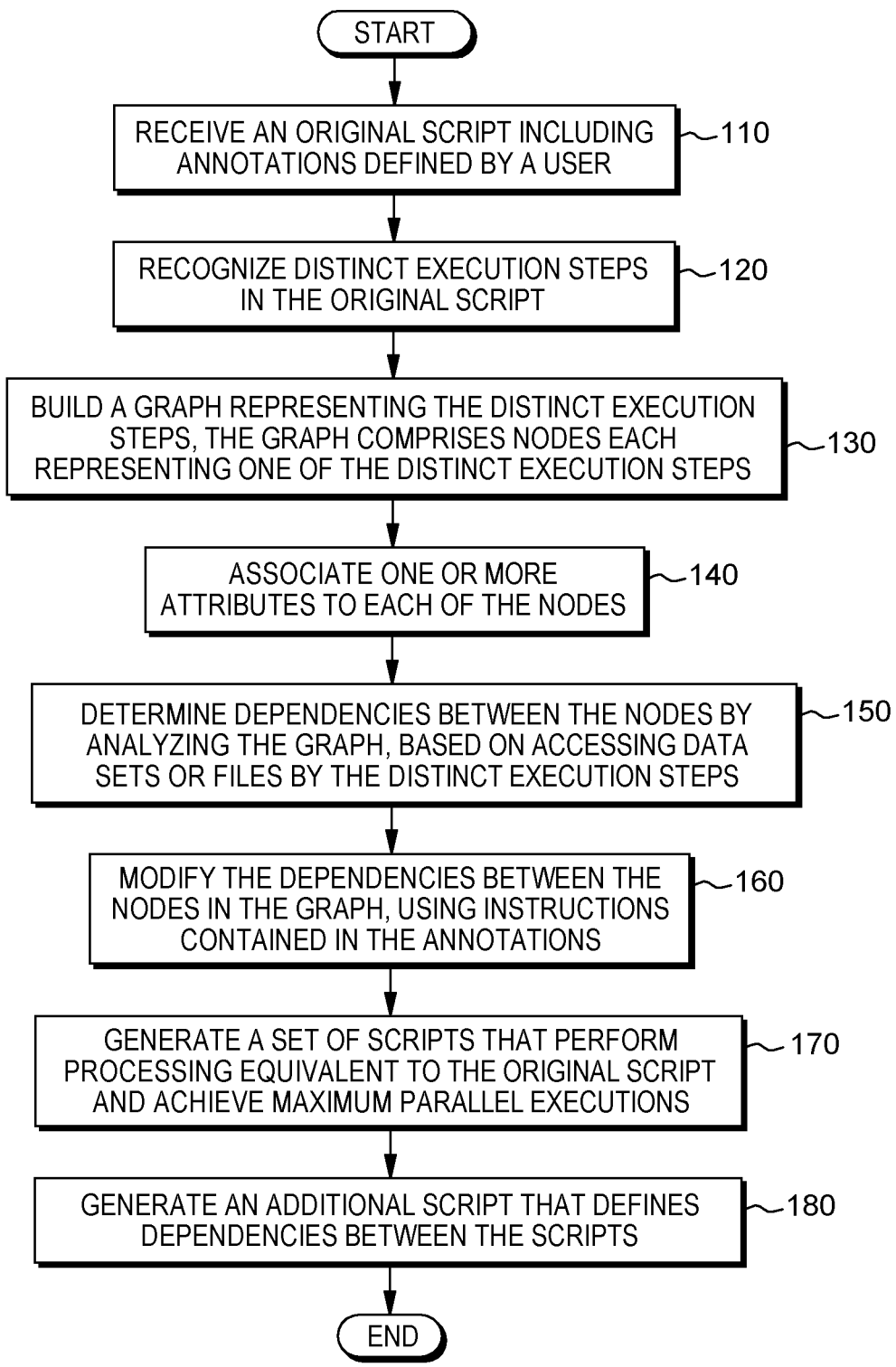
FIG. 1 is a flowchart illustrating operational steps for generating a set of scripts that perform processing equivalent to an original script and achieve maximum parallel executions, in accordance with one embodiment of the present invention.

FIG. 1 is a flowchart illustrating operational steps for generating a set of scripts that perform processing equivalent to an original script and achieve maximum parallel executions, in accordance with one embodiment of the present invention. The steps are implemented by a computer which is described in detail in latter paragraphs with reference to FIG. 4.

At step 110, the computer receives an original script including annotations defined by a user. The original script is a multiple-step script that describes batch processing. Some examples of such batch script are IBM® z/OS® JCL (Job Control Language) stream or Unix® shell script. JCL is a set of statements that a user codes to tell the z/OS® operating system about the work the user wants it to perform. A Unix® shell script is a computer program designed to be run by the Unix® shell, a command-line interpreter.

Referring to step 110 of FIG. 1, a scripting language may not be expressive enough to make all dependencies obvious or to make a lack of dependency obvious. For example, if a series of steps are using the same data set but do not update it, there is no real dependency between them; however, an analysis algorithm must necessarily be conservative and must assume that dependency exists. In the present invention, the disclosed method allows providing additional information to the analysis phase. The additional information is defined as "annotations to the original script". The annotations are expressed in some suitable syntax (tag language) and are added to the original script inside comments. Such annotations will not affect the execution of the original script because the annotations look like comments; however, the annotations allow a user (for example an application administrator) to explicitly add or remove dependencies based on the user's knowledge of the specifics of the application. More details of the annotations will be described in detail in latter paragraphs with reference with an example.

At step 120, the computer recognizes distinct execution steps in the original script during parsing the original script. Further, during the parsing the original script, at step 130, the computer builds a graph representing the distinct execution steps. In some embodiments, the graph comprises nodes each representing one of the distinct execution steps. The original set of dependencies between steps at this stage is chronological sequence. In other embodiments, a node in the graph does not have to necessarily represent a single execution step (or a single application); it may be convenient that the node represents a subset of steps as a single indivisible unit.

At step 140, the computer associates one or more attributes to each of the nodes. For example, the one or more attributes may be specifications of data sets or files accessed by the respective steps; the one or more attributes may also be original texts of the original script for the respective steps.

At step 150, through analyzing the graph, the computer determines dependencies between the nodes, based on accessing data sets or files by the distinct execution steps. Steps accessing the same data sets or files are assumed to be dependent on each other. Chronological sequence determined from the original script determines the direction of this dependency; for example, if step B is after step A in the original script and accesses the same data set, then it can be concluded that step B must be executed after step A. On the other hand, steps having no data sets or files in common are assumed to be independent.

At step 160, the computer modifies the dependencies between the nodes in the graph, using instructions contained in the annotations to the original script defined by a user. At step 170, the computer generates a set of scripts that perform processing equivalent to the original script and achieve maximum parallel executions, based on the nodes of the graph and the dependencies determined at steps 150 and 160. The scripts are generated for the respective nodes in the graph, each script for one node. The script for an execution step is generated using saved text from the execution step in the original script. The scripts require modifications to allow the scripts to become separately executable units. For example, with z/OS® JCL, each job requires a separate job statement. In addition, some attributes of the original script that have been specified at the script level will need to be inserted into the resulting scripts.

At step 170, the computer generates an additional script that defines dependencies between the scripts. For example, computer generates job groups and constituent job definition statements using z/OS® JCL. In this example, the additional script is the definition of a job group. Examples of the job group and the constituent job definition statements using z/OS® JCL are given in detail in later paragraphs.

Possible annotations are shown below as an example. Note that the syntax used below is just an example; in the original script including the annotations, instructions can be expressed by the annotations in any suitable syntax. The example of the original script (d/OS® JCL stream as an example) including the annotations is as follows. Note that the lines with bold fonts are annotations.

//<Job_control_model==JEC>
    //EXAMPLE JOB 1234 . . .
    //STEPA EXEC PGM=PROGA
    //X DD DSN=FRED,DISP=(NEW,CATLG), . . .
    //*
    //STEPB EXEC PGM=PROGB
    //X DD DSN=FRED,DISP=(SHR), . . .
    //*
    //STEPC EXEC PGM=PROGC
    //X DD DSN=FRED,DISP=(SHR), . . .
    //*
    //STEPD EXEC PGM=PROGD
    /*<Demarcation_marker==marker1>
    //X DD DSN=WILMA,DISP=(NEW,CATLG), . . .
    //*
    //STEPE EXEC PGM=PROGE
    //X DD DSN=DINO,DISP=(SHR), . . .

```
//*
//STEPF EXEC PGM=PROGF
//X DD DSN=BARNEY,DISP=(SHR), . . .
//*
//STEPG EXEC PGM=PROGG
/*<After-demarcation-marker=Marker1.>
//X DD DSN=BETTY,DISP=(SHR), . . .
```

In this example, the annotation of <Job_control_model=JEC> expresses an instruction that specifies a target control language if more than one is available. JEC (Job Execution Control) and DJC (Dependent Job Control) are examples of z/OS®-based control languages that express parallel execution of work steps. JEC is a feature available for this purpose in z/OS® JES2 component. DJC is a similar feature available in z/OS® JE3 component. JES2 and JES3 are two job entry subsystems provided by z/OS® and they provide different ways to describe dependencies between jobs. The job control constructs allow ordering of jobs; most importantly, they can specify which jobs can run concurrently.

In the example given above, the annotation of <No-dependency-demarcation> is added inside some execution steps and specifies that this execution step has no dependency on any other step within the script. The annotation of <Demarcation_marker=markerX> is added inside some execution steps and provides a reference marker to be used in other annotations. The annotation of <After-demarcation-marker-=MarkerX.> is added inside some execution steps and specifies that this step has an "after" dependency on another step identified by a marker established by a <Demarcation_marker> annotation; the annotation indicates that a current step must be executed after another step. The annotation of <Before-demarcation-marker=MarkerX.> is similar to the "after" annotation, but it establishes a "before" dependency which is a reverse of the "after" dependency.

Figure 2:
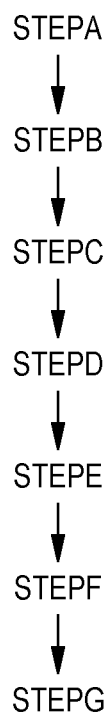
FIG. 2 is a diagram illustrating an example of a sequence of execution in an original script, in accordance with one embodiment of the present invention.
Figure 3:
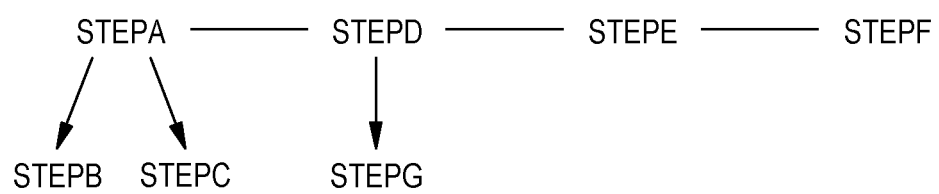
FIG. 3 is a diagram illustrating an example of a sequence of execution after determining dependencies between steps and after processing annotations, in accordance with one embodiment of the present invention.

In the example given above. STEPB and STEPC are dependent on the output from STEPA. Both STEPB and STEPC can run after STEPA since they can share the output of STEPA. STEPA, STEPD, STEPE, and STEPF can run at the same time. STEPG can only run after STEPD. This dependency is explicitly specified via the annotation of <After-demarcation-marker>. FIG. 2 illustrates the sequence of execution in the original script, while FIG. 3 illustrates the sequence of execution after determining dependencies between steps and after processing annotations shown in the above example.

In the example given above, the job execution control model is JEC, which is specified by <Job_control_model> annotation. Without the method disclosed in the present invention, the jobs run serially even though a step has no dependency on another. Also, usage of <After-demarcation-marker> annotation demonstrates how to define a dependency which cannot be detected by parsing the original JCL stream.

The example of the JEC job group is as follows:
```
//EXAMPLE JOBGROUP, . . .
//*
//JOBD GJOB
//*
//JOBE GJOB
//*
//JOBF GJOB
//*
//JOBA GJOB
//CONCURRENT NAME=(JOBD,JOBE,JOBF)
//*
//JOBB GJOB
//AFTER NAME=JOBA
//*
//JOBC GJOB
//AFTER NAME=JOBA
//*
//JOBG GJOB
//AFTER NAME=JOBD
//*
//EXAMPLE ENDGROUP
```

The example of a JCL stream for constituent jobs is as follows:
```
//JOBA JOB 1234, . . .
//SCHEDULE JOBGROUP=EXAMPLE
//STEPA EXEC PGM=PROGA
//X DD DSN=FRED,DISP=(NEW,CATLG), . . .
//*
//JOBB JOB 1234, . . .
//SCHEDULE JOBGROUP=EXAMPLE
//STEPB EXEC PGM=PROGB
//X DD DSN=FRED,DISP=(SHR), . . .
//*
//JOBC JOB 1234, . . .
//SCHEDULE JOBGROUP=EXAMPLE
//STEPC EXEC PGM=PROGC
//X DD DSN=FRED,DISP=(SHR), . . .
//*
//JOBD JOB 1234, . . .
//SCHEDULE JOBGROUP=EXAMPLE
//STEPD EXEC PGM=PROGD
//X DD DSN=WILMA,DISP=(NEW,CATLG), . . .
//*
//JOBE JOB 1234, . . .
//SCHEDULE JOBGROUP=EXAMPLE
//STEPE EXEC PGM=PROGE
//X DD DSN=DINO,DISP=(SHR), . . .
//*
//JOBF JOB 1234, . . .
//SCHEDULE JOBGROUP=EXAMPLE
//STEPF EXEC PGM=PROGF
//X DD DSN=BARNEY,DISP=(SHR), . . .
//*
//JOBG JOB 1234, . . .
//SCHEDULE JOBGROUP=EXAMPLE
//STEPG EXEC PGM=PROGG
//X DD DSN=BETTY,DISP=(SHR), . . .
```

The user can submit the job group and then submit the JCL stream for the constituent jobs shown above. In the above examples, JOBA. JOBD. JOBE, and JOBF can all run concurrently. Maximum parallel execution is achieved.

Figure 4:
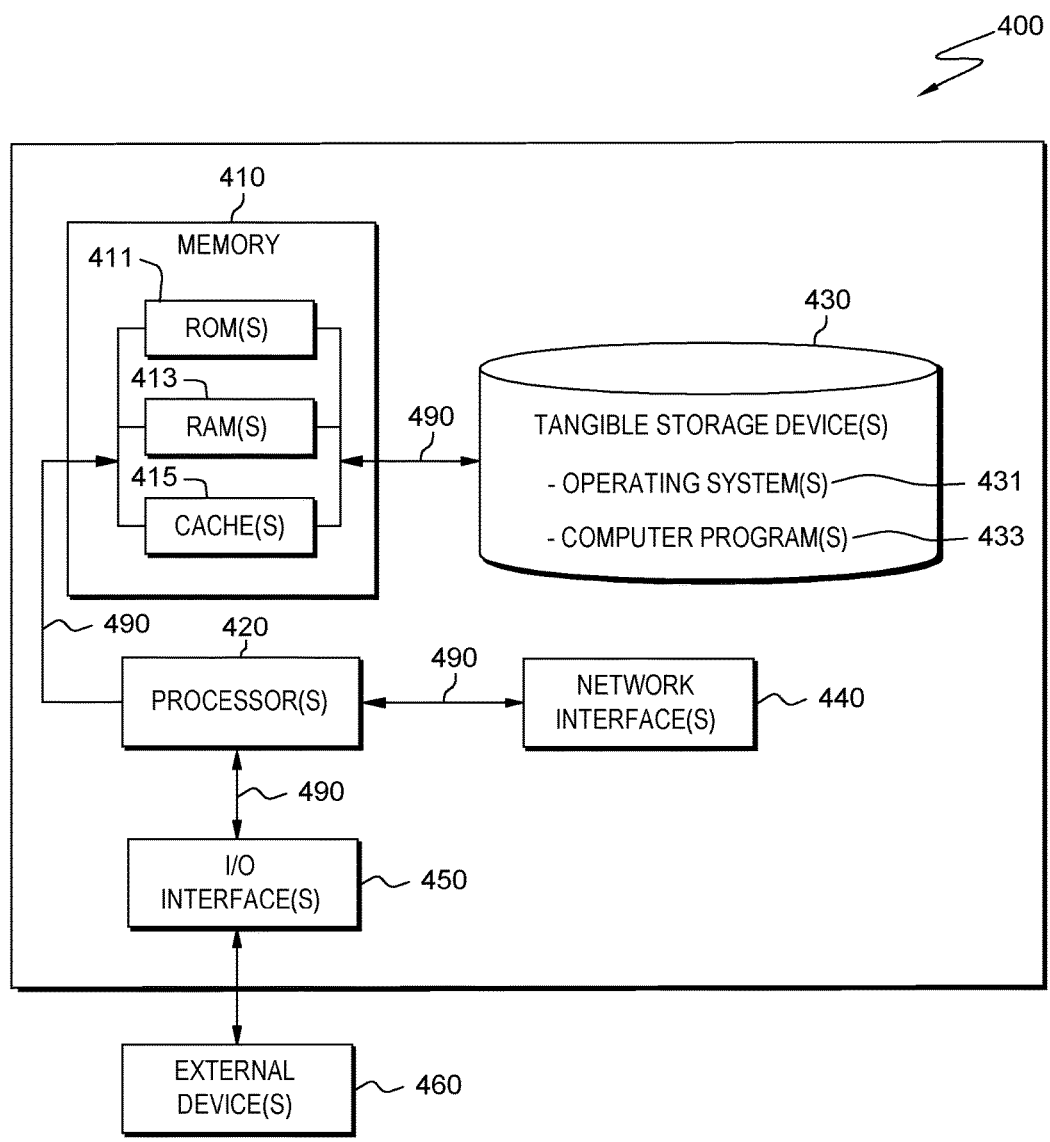
FIG. 4 is a diagram illustrating components of a computer device for executing the operational steps shown in FIG. 1, in accordance with one embodiment of the present invention.

FIG. 4 is a diagram illustrating components of computer device 400 for executing the operational steps shown in FIG. 1, in accordance with one embodiment of the present invention. It should be appreciated that FIG. 4 provides only an illustration of one implementation and does not imply any limitations with regard to the environment in which different embodiments may be implemented. The computer device may be any electronic device or computing system capable of receiving input from a user, executing computer program instructions, and communicating with another electronic device or computing system via a network.

Referring to FIG. 4, computer device 400 includes processor(s) 420, memory 410, and tangible storage device(s) 430. In FIG. 4, communications among the above-mentioned components of computer device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430. One or more computer programs 433 include one or more program for executing the operational steps shown in FIG. 1 to generate a set of scripts that perform processing equivalent to an original script and achieve maximum parallel executions. Computer device 400 further includes I/O interface(s) 450. I/O interface(s) 450 allows for input and output of data with external device(s) 460 that may be connected to computer device 400. Device 400 further includes network interface(s) 440 for communications between computer device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a set of scripts that perform processing equivalent to an original script and achieve maximum parallel executions, the method comprising:
   receiving, by a computer, an original script, wherein the original script includes annotations defined by a user, wherein the annotations define dependencies between execution steps which cannot be detected by parsing the original script without the annotations;
   parsing the annotations, by the computer, to recognize the execution steps in the original script;
   building, by the computer, a graph comprising nodes, the graph representing the execution steps in the original script;
   associating, by the computer, one or more attributes to the nodes, the one or more attributes being specifications of at least one of data sets and files accessed by the execution steps;
   determining, by the computer, by analyzing the graph, dependencies between the nodes, based on accessing the at least one of data sets and files by the execution steps;
   modifying, by the computer, the dependencies between the nodes, using instructions contained in the annotations;
   generating, by the computer, a set of scripts that perform processing equivalent to the original script and achieve maximum parallel executions, based on the nodes of the graph and the dependencies between the nodes; and
   generating, by the computer, an additional script that defines dependencies between the scripts;
   wherein the annotations are expressed in a tag language and added inside comments in the original script, and
   wherein the annotations specify one or more execution steps that have no dependency on any other execution step within the original script.

2. The method of claim 1, wherein the annotations specify a target control language.

3. The method of claim 1, wherein the annotations specify the dependencies between the nodes.

4. The method of claim 1, wherein a respective one of the nodes in the graph represents one of the execution steps.

5. The method of claim 1, wherein a respective one of the nodes in the graph represents a set of the execution steps.

6. A computer program product for generating a set of scripts that perform processing equivalent to an original script and achieve maximum parallel executions, the computer program product comprising one or more computer-readable tangible storage devices and program instructions stored on at least one of the one or more computer-readable tangible storage devices, the program instructions executable to:
   receive, by a computer, an original script, wherein the original script includes annotations defined by a user, wherein the annotations define dependencies between execution steps which cannot be detected by parsing the original script without the annotations;
   parse the annotations, by the computer, to recognize execution steps in the original script;
   build, by the computer, a graph comprising nodes, the graph representing execution steps in the original script;
   associate, by the computer, one or more attributes to the nodes, the one or more attributes being specifications of at least one of data sets and files accessed by the execution steps;
   determine, by the computer, by analyzing the graph, dependencies between the nodes, based on accessing the at least one of data sets and files by the execution steps;
   modify, by the computer, the dependencies between the nodes, using instructions contained in the annotations;
   generate, by the computer, a set of scripts that perform processing equivalent to the original script and achieve maximum parallel executions, based on the nodes of the graph and the dependencies between the nodes; and
   generate, by the computer, an additional script that defines dependencies between the scripts;
   wherein the annotations are expressed in a tag language and added inside comments in the original script, and
   wherein the annotations specify one or more execution steps that have no dependency on any other execution step within the original script.

7. The computer program product of claim 6, wherein the annotations specify a target control language.

8. The computer program product of claim 6, wherein the annotations specify the dependencies between the nodes.

9. The computer program product of claim 6, wherein a respective one of the nodes in the graph represents one of the execution steps.

10. The computer program product of claim 6, wherein a respective one of the nodes in the graph represents a set of the execution steps.

11. A computer system for generating a set of scripts that perform processing equivalent to an original script and achieve maximum parallel executions, the computer system comprising:
    one or more processors, one or more computer readable tangible storage devices, and program instructions stored on at least one of the one or more computer readable tangible storage devices for execution by at least one of the one or more processors, the program instructions executable to:
    receive, by a computer, an original script, wherein the original script includes annotations defined by a user, wherein the annotations define dependencies between execution steps in the original scripts which cannot be detected by parsing the original script without the annotations;
    parse the annotations, by the computer, to recognize execution steps in the original script;
    build, by the computer, a graph comprising nodes, the graph representing execution steps in the original script;
    associate, by the computer, one or more attributes to the nodes, the one or more attributes being specifications of at least one of data sets and files accessed by the execution steps;
    determine, by the computer, by analyzing the graph, dependencies between the nodes, based on accessing the at least one of data sets and files by the execution steps;
    modify, by the computer, the dependencies between the nodes, using instructions contained in the annotations;
    generate, by the computer, a set of scripts that perform processing equivalent to the original script and achieve maximum parallel executions, based on the nodes of the graph and the dependencies between the nodes; and generate, by the computer, an additional script that defines dependencies between the scripts;

wherein the annotations are expressed in a tag language and added inside comments in the original script, and wherein the annotations specify one or more execution steps that have no dependency on any other execution step within the original script.

12. The computer system of claim 11, wherein the annotations specify a target control language.

13. The computer system of claim 11, wherein the annotations specify the dependencies between the nodes.

14. The computer system of claim 11, wherein a respective one of the nodes in the graph represents one of the execution steps or a set of the execution steps.

* * * * *